United States Patent
Lee et al.

(10) Patent No.: US 7,313,375 B2
(45) Date of Patent: Dec. 25, 2007

(54) FOLLOW-ME BROADCAST RECEPTION METHOD AND SYSTEM

(75) Inventors: Chinmei Chen Lee, Woodridge, IL (US); John Alvan Voelker, Aurora, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 521 days.

(21) Appl. No.: 10/137,989

(22) Filed: May 2, 2002

(65) Prior Publication Data

US 2004/0198217 A1    Oct. 7, 2004

(51) Int. Cl.
*H04B 1/18*    (2006.01)

(52) U.S. Cl. .............................. 455/186.1; 455/185.1; 455/194.1; 455/426.1

(58) Field of Classification Search ................ 455/524, 455/561, 458, 517, 463, 422.1, 552.1, 184.1, 455/185.1, 186.1, 194.1, 3.01, 3.02, 456.1
See application file for complete search history.

(56) References Cited

U.S. PATENT DOCUMENTS

| | | | | |
|---|---|---|---|---|
| 5,428,825 A * | 6/1995 | Tomohiro et al. | ........ | 455/186.1 |
| 5,572,221 A * | 11/1996 | Marlevi et al. | ............. | 455/440 |
| 5,819,166 A * | 10/1998 | Kimura et al. | ........... | 455/186.1 |
| 6,091,961 A * | 7/2000 | Khalil | ........................ | 455/517 |
| 6,282,412 B1 * | 8/2001 | Lyons | ..................... | 455/186.1 |
| 6,463,265 B1 * | 10/2002 | Cohen et al. | ............ | 455/186.1 |
| 6,675,022 B2 * | 1/2004 | Burgan et al. | .............. | 455/524 |
| 7,003,289 B1 * | 2/2006 | Kolls | ....................... | 455/422.1 |
| 7,107,063 B1 * | 9/2006 | Bates et al. | .............. | 455/456.1 |
| 2002/0040433 A1 * | 4/2002 | Kondo | ........................ | 713/180 |
| 2002/0132617 A1 * | 9/2002 | Nuss et al. | .................. | 455/422 |
| 2002/0142722 A1 * | 10/2002 | Gutta et al. | .................... | 455/45 |
| 2002/0142759 A1 * | 10/2002 | Newell et al. | .............. | 455/517 |
| 2004/0203729 A1 * | 10/2004 | Makipaa et al. | ......... | 455/186.1 |
| 2004/0252051 A1 * | 12/2004 | Johnson | ................... | 455/456.3 |
| 2005/0075119 A1 * | 4/2005 | Sheha et al. | ............. | 455/456.6 |

FOREIGN PATENT DOCUMENTS

JP        03188716 A  *  8/1991

* cited by examiner

*Primary Examiner*—Lana Le

(57) ABSTRACT

Methods and systems for seamlessly broadcasting data to a user moving among a plurality of broadcast coverage areas. A first signal containing desired data may be received by a receiving device at a user location, wherein the first signal is broadcast from a first transmitting station associated with a first broadcast coverage. Thereafter, the receiving device (e.g., a radio or in-vehicle television) can be automatically instructed to search for and tune to a second transmitting station associated with a second broadcast coverage area broadcasting a second signal containing the desired data if the first signal fades at the user location, thereby permitting the user to seamlessly receive data as the user moves among a plurality of broadcast coverage areas. The receiving device can also be automatically instructed to search for and tune to a third transmitting station broadcasting a third signal containing data of a type associated with the desired data, if the second signal containing the desired program cannot be identified.

16 Claims, 6 Drawing Sheets

FOLLOW-ME BROADCAST RECEPTION METHOD AND SYSTEM

TECHNICAL FIELD

The present invention is generally related to radio and television broadcasting methods and systems. The present invention is also related to wireless networks and methods and systems for transmitting data to and from wireless networks. The present invention is additionally related to in-vehicle wireless data transmission and receiving methods and systems.

BACKGROUND OF THE INVENTION

In-vehicle devices, such as televisions, radios, and computers are becoming increasingly popular for use with automobiles, trucks, vans, and recreational vehicles such as campers and boats. Such in-vehicle devices, including Internet-enabled personal digital assistants (PDAs) and wireless cellular telephones, are also being integrated with modern vehicles. Consequently, car, truck, van, and motor home manufacturers and suppliers have become increasingly aware of the need to provide for the installation or accommodation of various electronic devices, particularly video screens (e.g., television) in their automobiles. Thus, attempts are currently being made to equip modern vehicles with high-technology communication systems, which can permit consumers to convert previously wasted commuting time into productive work or entertainment hours. It is anticipated that multimedia technologies will advance tremendously in the coming years, and that so-called "telematics" (i.e., in-vehicle multi-media and telecommunications systems) will increasingly become a part of everyday vehicle usage.

One of the problems that modern in-vehicle devices and systems face is the inability to seamlessly provide data to a mobile user. For example, a radio or television viewer in an automobile typically experiences fading signals as the automobile moves out of the coverage area of a broadcast station. The listener or viewer is thereafter forced to manually search for a new station that may broadcast the same program, if one is available. This can be a time consuming, distracting and even dangerous task, particularly on a busy highway.

Various types of solutions to this problem have been proposed. For example, so-called "Web agents" have been proposed for assisting mobile wireless users in receiving data such as radio and television programs. In such configurations, an agent associated with the user can be utilized to send the location of the user from a GPS locator positioned within a cellular phone, along with a user's music profile to a radio station index agent. The radio station index agent then can return a list of the best matching radio stations to the mobile user, including current play lists. Such a "Web agent," if in communication with an in-vehicle computer could be utilized for automatically tuning radio stations.

The problem with the use of "Web agents" is that such devices do not result in the seamless receipt of broadcasts at the location of the mobile user. These type of agents fail to utilize information implicit in the user's current tuning of his/her radio/television and to utilize recent historical information regarding the location of the user. In addition, these types of agents may rely solely on GPS information in locating the user. For users, GPS may simply not be available.

The ability to provide the seamless transmission of desired data, such as a favorite television or radio program, presents a challenge that until now has not been adequately addressed. The present inventors have thus concluded, based on the foregoing, that a genuine need exists for improved in-vehicle devices and systems thereof that can permit continued program listening, viewing and other multimedia experiences for a mobile user. A method and systems are thus disclosed herein for seamlessly broadcasting user-selected data to a user moving among a plurality of broadcast coverage areas.

BRIEF SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings and abstract as a whole.

It is therefore one aspect of the present invention to provide an improved radio and television reception method and system adapted for users moving relative to broadcast reception areas.

It is yet another aspect of the present invention to utilize an in-vehicle wireless data transmission and receiving method and system which provides control information for the tuning of an in vehicle television or radio.

It is also an aspect of the present invention to provide an in-vehicle architecture for permitting seamless broadcasting of data to a mobile user moving among a plurality of broadcast areas.

It is a further aspect of the present invention to provide a Follow-me Broadcast Reception Service (FBRS).

The above and other aspects of the invention can be achieved as will now be briefly described. Methods and systems for seamlessly adjusting tuning to broadcast data by a user moving among a plurality of broadcast coverage areas are disclosed herein. A first signal containing desired data may be received by a receiving device at a first user location, wherein the first signal is broadcast from a first transmitting station associated with a first broadcast coverage area or zone. Thereafter, the receiving device (e.g., a radio or in-vehicle television) can be automatically instructed to tune to a second transmitting station associated with a second broadcast coverage area or zone broadcasting a second signal containing the desired data if the first signal fades at the second user location, thereby permitting the user to seamlessly receive data as the user moves among a plurality of broadcast coverage areas. The receiving device can also be automatically instructed to tune to a third transmitting station broadcasting a third signal containing data of a type associated with the desired data, if the second signal containing the desired program cannot be identified. The present invention disclosed herein can thus be implemented utilizing a Follow-me Broadcast Reception Service (FBRS), which is described in greater detail herein, and which generally comprises a located-based service that provides seamless program listening or viewing capabilities for a radio or television broadcast receiver when a mobile user moves location among coverage areas having broadcast stations therein.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

DETAILED DESCRIPTION OF THE INVENTION

The particular values and configurations discussed in these non-limiting examples can be varied and are cited merely to illustrate an embodiment of the present invention and are not intended to limit the scope of the invention.

Figure 1:
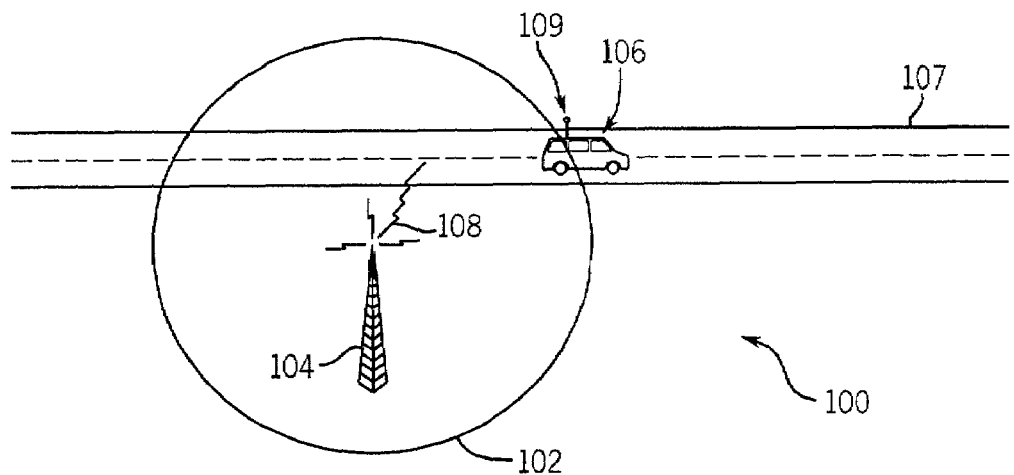
FIG. 1 illustrates a schematic diagram of a first broadcast coverage area and a transmitting station thereof in accordance with a preferred embodiment of the present invention.

FIG. 1 illustrates a schematic diagram 100 of a broadcast coverage area 102 and a transmitting station 104 thereof in accordance with a preferred embodiment of the present invention. As indicated in FIG. 1, a mobile user 106 passes through broadcast coverage area 102 and can receive a signal 108 via a receiving device 109 located, for example, within his or her vehicle. Transmitting station 104 may be, for example, a radio or television transmitter associated with a particular radio or television station. Mobile user 106 may be located for example within a moving vehicle traveling through broadcast coverage area 102. As mobile user 106 passes through broadcast area 102 along a path 107, a signal 108 can be received at the user location.

Signal 108 can contain desired data, such as, for example, a radio or television program broadcast. It can be assumed that mobile user 106 previously tuned his or her receiving device (e.g., car radio, in-vehicle television, etc.) to a frequency containing such desired data. This data is considered "desired" data, because it is chosen or selected by mobile user 106. For example, mobile user 106 may have previously tuned his car radio to a favorite radio talk show program or musical listening program. As mobile user 106 passes away from the broadcast coverage area 102, signal 108 may begin to fade. Thus, mobile user 106 may experience fading signals when his or vehicle moves in and out of broadcast coverage areas.

Figure 2:
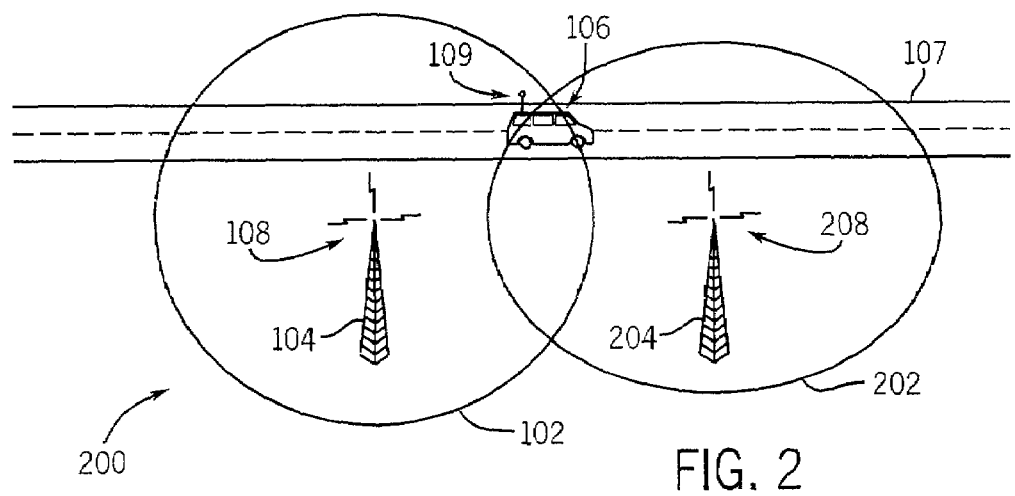
FIG. 2 depicts a schematic diagram of more than one coverage area and transmitting stations thereof in accordance with a preferred embodiment of the present invention.

FIG. 2 depicts a schematic diagram 200 of a plurality of broadcast coverage areas 102, 202 and transmitting stations 104, 204 thereof in accordance with a preferred embodiment of the present invention. Note that in FIGS. 1 and 2, like or analogous elements are indicated by identical reference numerals. Thus, as illustrated in FIG. 2, mobile user 106 continues traveling along path 107. As signal 108 begins to fade, a receiving device 109 located at the location of mobile user 106 can be automatically instructed to tune to another transmitting station 204 broadcasting a signal 208 containing the same desired data being broadcasted from transmitting station 104, if the signal 108 begins to fade at the current location (i.e., user location) of mobile user 106. Note that transmitting station 204 is associated with a broadcast coverage area 202.

Assume, for example, that transmitting station 104 broadcasts a signal carrying a national news program at a frequency below or approximately equal to 600 MHz. Note that such a frequency is described herein for illustrative purposes only and is not considered a limiting feature of the present invention. For example, transmitting station 104 (e.g., a television transmitting station) may broadcast a signal carrying the national news program in a VHF range of for example, 54-72 MHz, 76-88 MHz or 174-216 MHz, or a UHF range of 470-512 MHz or 512-608 MHz, which are found in the allocated spectrum for United States broadcasting. Those skilled in the art can appreciate that other frequencies may be utilized, depending on a desired implementation and geographic location. For example, other countries may permit broadcasting in frequency ranges not utilized in the United States.

Also assume that transmitting station 204 broadcasts the same national news program at a frequency of 500 Mhz. Mobile user 106 had previously tuned to the 600 Mhz frequency to receive a clear signal carrying the national news program. As mobile user 106 passes out of broadcast area 102, signal 108 will begin to fade. As this occurs, the car radio and/or in-vehicle television (e.g., receiving device 109) receiving signal 108 is automatically instructed tune to a different frequency (e.g., 500 Mhz) and a different signal thereof, such as, for example, signal 208, which broadcasts the same radio program being broadcast at the 600 Mhz frequency, thereby permitting mobile user 106 to seamlessly receive the national news program as he or she moves among a plurality of broadcast coverage areas. Note that as utilized herein the term "seamlessly" or "seamless" generally can refer to the smooth transition from one broadcast to another without prolonged interruption (e.g., an interruption last no longer than 3-4 seconds).

The car radio or receiving device (e.g., a television) at the user location can thus be configured to operate in association with a Follow-me Broadcast Reception Service (FBRS), which comprises a location-based service that provides seamless listening or viewing for a radio or television receiver when mobile user 106 moves (e.g., as in a moving vehicle) among the coverage areas of broadcast stations. Such a service is referred to as a "Follow-me" service because it permits a user, such as mobile user 106, to continue to listen to or view a desired program despite travel through varying broadcast coverage areas. In essence, the desired program automatically "follows" the mobile user 106 through varying geographic locations. Such an FBRS can, upon a listener or viewer request, automatically search for and tune to a different station broadcasting the same program, if one is available, as the original signal fades. If the request of the listener or viewer is not available in the area, a station of the same theme (e.g., soft rock) can be automatically identified and tuned to utilizing the FBRS, if the listener (i.e. mobile user 106) has indicated this preference to an FBRS provider previously. The FBRS can therefore provide service based on a user profile. A signal (frequency) broadcast from a second transmitting station associated with a second broadcast coverage for tuning thereof can thus be selected based on the data (i.e., user data) contained in the user profile within a database. An example of such a database is described in greater detail herein with respect to FIG. 5 (i.e., see database 510).

Figure 3:
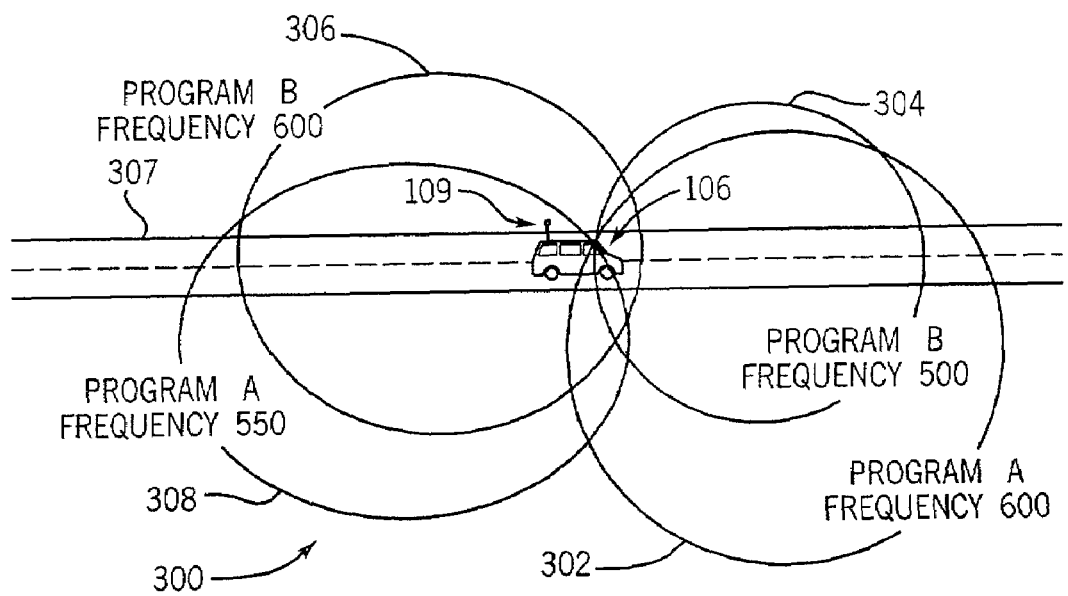
FIG. 3 illustrates a schematic diagram of a broadcast coverage map, in accordance with a preferred embodiment of the present invention.

FIG. 3 illustrates a schematic diagram 300 of a broadcast coverage map, in accordance with a preferred embodiment of the present invention. Note that in FIGS. 1 to 3, like or analogous parts are indicated by identical reference numerals. Schematic diagram 300 illustrates a problem that can be solved utilizing the FBRS. As indicated in FIG. 3, four broadcast coverage areas 302, 304, 306 and 308 are illustrated. Broadcast coverage area 302 is associated with a transmitter station that transmits a Program A at a frequency of 600 MHz. Broadcast coverage area 304 is associated with a transmitter station that transmits a Program B at a frequency of 500 MHz. Similarly Broadcast coverage area 306 is associated with a transmitter station that transmits a Program B at a frequency of 600 MHz, while broadcast coverage area 308 is associated with a transmitter station that transmits a Program A at a frequency of 550 MHz. Schematic diagram 300 illustrates a scenario that the FBRS may face. Mobile user 106 may report, for example, being tuned to a frequency of 600 MHz as he or she moves along a path 307. Mobile user 106 may, however, be receiving both Programs A and B at that frequency. Based on the foregoing, the question arises how can the desired program (i.e., desired data) be determined?

Figure 4:
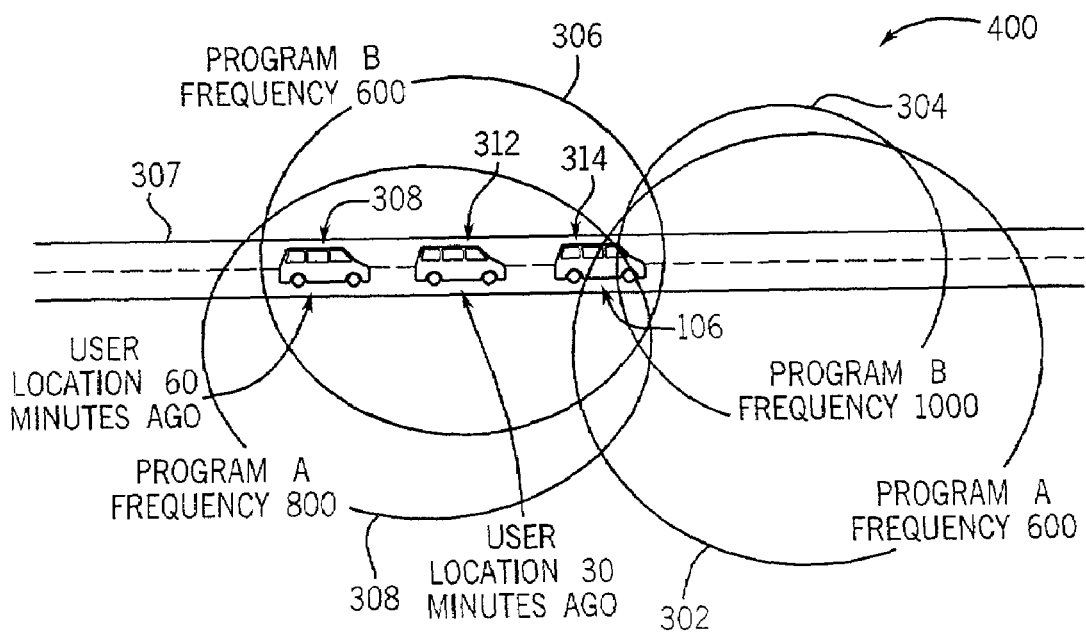
FIG. 4 thus depicts an alternative version of the schematic diagram illustrated in FIG. 3, in accordance with a preferred embodiment of the present invention.

FIG. 4 depicts a schematic diagram 400 illustrating a solution to the problem set forth in FIG. 3. FIG. 4 depicts an alternative version of the schematic diagram illustrated in FIG. 3, in accordance with a preferred embodiment of the present invention. Note that in FIGS. 3 and 4, like parts are indicated by identical reference numerals. Schematic diagram thus illustrates the four broadcast coverage areas 302, 304, 306 and 308, which are also depicted in FIG. 3. As indicated in schematic diagram 400, broadcast coverage area 302 is associated with a transmitter station that transmits a Program A at a frequency of 600 MHz. Broadcast coverage area 304 is associated with a transmitter station that transmits a Program B at a frequency of 500 MHz. Similarly Broadcast coverage area 306 is associated with a transmitter station that transmits a Program B at a frequency of 600 MHz, while broadcast coverage area 308 is associated with a transmitter station that transmits a Program A at a frequency of 550 MHz.

The ambiguity presented in FIGS. 3 and 4 can be resolved by maintaining and using the history of the user location. For example, user location 308 indicates the location of mobile user 106 sixty minutes previously, while user location 312 indicates the location of mobile user 106 thirty minutes previously. User location 314 indicates the present location of mobile user 106. Thus, for example, while tuned to a frequency of 600 MHz, the ambiguity originally discussed above with respect to FIG. 3 can be resolved by utilizing the user location history and deducing that the program, which the user desires to continue hearing, is in fact Program B. Based on this deduction, the associated FBRS instructs the receiving device to switch to a frequency of 500 MHz.

Figure 5:
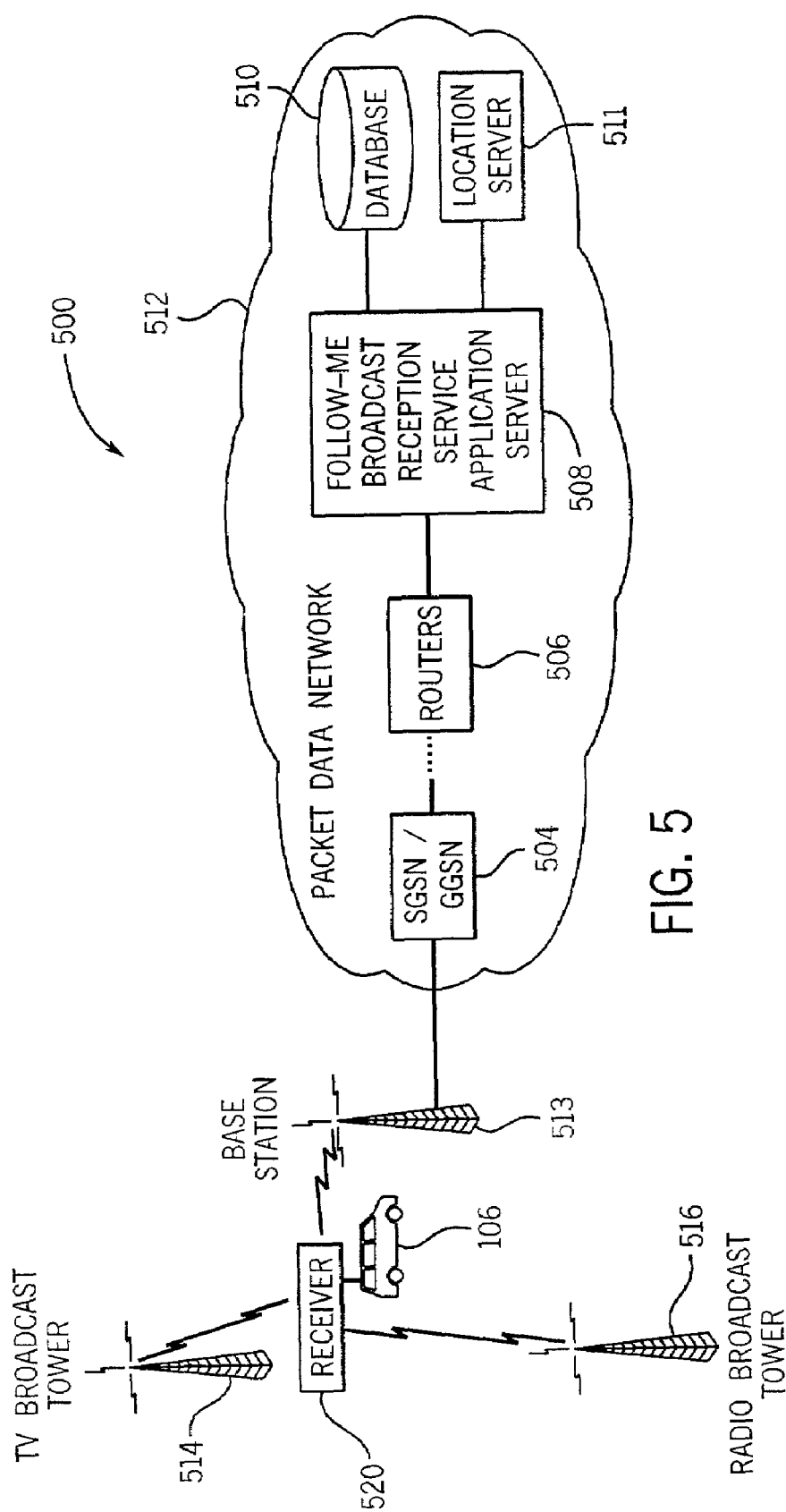
FIG. 5 illustrates a schematic diagram of a network architecture that can be implemented in accordance with a preferred embodiment of the present invention.

FIG. 5 illustrates a schematic diagram 500 illustrating a network architecture that may be implemented in accordance with a preferred embodiment of the present invention. Note that in FIGS. 1 to 5, like or similar parts may be indicated by identical reference numerals. The present invention can make use of an FBRS server as will now be described to accomplish historical tracking of the location of a mobile user (e.g., a car) in order to determine desired frequencies and programs thereof. Referring to FIG. 5, an in-car receiving device 520 (e.g., an in-vehicle wireless data communication device) can send a signal to an FBRS server 508 through a wireless network 512. Note that wireless network 512 can be configured as a packet data network. The associated FBRS system operates automatically, generally requiring no human intervention short of an initial intervention or first time providing of basic user profile information to a database 510 associated with the FBRS system. The FBRS server 508 can maintain a history of the mobile user's location and the frequency to which the user's radio/television was tuned while at that location. It utilizes this history to resolve the ambiguity in mapping the user location and tuned-to frequency to the identity of a station to which the user has been listening, and thereby find a replacement station that is broadcasting the same program closer to the user's current location.

A location server 511 generally transfers location information to FBRS server 508, which assists in the compilation of the user's location history, which is maintained by FBRS server 508. As explained further herein, the location of the user may be determined through either a GPS systems or a wireless network having locating capabilities to determine such a location. Thus, as illustrated in schematic diagram 500, a mobile user 106 can receive data, such as a television program, carried by a signal transmitted from a television transmitter 514, which may be configured as a television broadcast tower. The signal can be received via a receiving device 520 (e.g., an in-vehicle television) located at or in association with mobile user 106. Note that receiving device 520 may comprise a device that receives a television and/or radio signal, which is different from a device that communicates with a wireless network (i.e., wireless data network). An example of a device that communicates with a wireless data network is illustrated and described in greater detail herein with respect to FIG. 6 (i.e., In-vehicle network interface device) and FIG. 7 (In-vehicle network interface device 710). Such a device may operate utilizing a frequency different than that utilized by the device, which receives a television and/or radio signal. Additionally, mobile user 106 can receive data, such as a radio program, carried by a signal transmitted from a radio transmitter 516, which may be configured as a radio broadcast tower. Note that receiving device 520 is generally analogous to receiving device 109, which is depicted in FIGS. 1 to 3.

Those skilled in the art can appreciate that receiving device 520 can be configured as a combination television/radio device, and can be located within a moving vehicle. Receiving device 520 is illustrated as a block in FIG. 5 for general edification and explanatory purposes and is not considered a specific limiting feature of the present invention. Thus, it can be assumed that receiving device 520 can be fitted within a vehicle, such as a van, car, truck or boat and is generally in communication with an antenna, which may be located within or external to the vehicle. As such, mobile user 106 may also communicate with a base station 513, which in turn may communicate with a network data communication infrastructure (i.e., SGSN/GGSN 504).

Wireless network 512 can be configured to include a Serving GPRS Support Node and a Gateway Support Node, which are generally indicated in FIG. 5 as SGSN/GGSN 504. GPRS (or its evolution UMTS) is well known in the telecommunications arts. General Packet Radio Service (GPRS) generally comprises a wireless service utilized as a foundation for a variety of data services, which are based on packet transmission principles. GPRS can support a wide range of bandwidths by the efficient use of limited bandwidths and can be utilized for sending and receiving small bursts of data, such as e-mail and Web browsing, as well as a large amount of information.

The use of GPRS permits the implementation of mobile Internet applications, and allows users to access corporate intranets or Internet service providers (ISP) from a mobile device. Users can remain online without continuously occupying a specific radio channel. Each channel can be shared by several users and are generally only utilized when data packets are sent or received. GPRS typically includes a number of support nodes, including a serving GPRS support node (SGSN) and a gateway GPRS support node (GGSN). SGSN/GGSN 504 is thus representative of a type of General Packet Radio Service (GPRS) router that can performs GPRS specific functions to handle mobility in wireless packet networks. SGSN and GGSN nodes are also well known in the telecommunications arts.

SGSN/GGSN 504 can communicate with one or more routers 506, which in turn can communicate with a remote server 508, which can be configured to function as a Follow-me Broadcast Reception Service (FBRS) application server. Remote server 508 in turn can communicate with a database 510, which may include a user profile associated with mobile user 106, including user programming preferences (e.g., favorite television and radio programs, and/or favorite types of television and radio programs). Database 510 also can include information concerning a station broadcast geographical area and a history of subscriber locations, in addition to a subscriber profile and/or station profile (i.e., frequency, program, etc). Remote server 508 can interface with a location server 511 to request and receive location information. The Location Server 511 interfaces with location measurement equipment, such as cellular cell sites (e.g., base station 513), Global Positioning Satellite (GPS) ground stations, and/or mobile user 106 (e.g., a GPS-enabled vehicle). Location server 511 can also determine the location of mobile user 106 and transfer the location of mobile user 106 to the FBRS application server 508.

Note that as utilized herein, the term "GPS" is well known in the art and refers generally to a global positioning system, including Global Positioning Satellites thereof, which can provide data leading to the precise whereabouts of a GPS receiver. Effectively, the satellite does not move with respect to a specific ground location on the earth so that it effectively has the operating advantages of a very tall antenna, indeed, an antenna extending about 20,000 miles up into space. A signal can be transmitted from a GPS satellite and received by a GPS receiver located on the earth. Data can then be processed, which provides an indication of the location whereabouts of the GPS receiver. GPS systems have recently been added to automobiles to provide the location of the automobile. Through the use of the GPS satellite, an in-vehicle GPS receiver and stored data thereof, a screen can be presented to the driver, which informs the driver of the location of the vehicle with respect to a stored memory entry indicative of the map of a given city, to pick an example. The streets, buildings, and obstacles of a map in a given city may be stored on a CD ROM or other memory device (e.g., a memory device located at a remote server within a wireless telecommunications network).

Database 510 includes information pertaining to the strength or weakness of signals generated by broadcasting stations in relation to particular geographic coverage areas. For example, database 510 may maintain data indicating that a stronger signal can be picked up within an inner area of a geographic coverage area, while a weaker signal may only be found at an outer area of the same geographic coverage area. Database 510 may also maintain information about specific types of categories of programs that the user prefers (i.e., talk radio, public radio, hard rock, and so forth), and the type of receiving device(s) (e.g., television, radio, etc.) in the user's vehicle. For simplicity, the term "database" may also be utilized herein to refer to the storage of fairly dynamic and short-lived information, which may be required by the FBRS. Such increasingly dynamic data can include the following: the frequency to which the user is currently tuned, the current geographic location of the user, past locations of the user at the currency frequency, the program to which the user is currently tuned, current stations received by the user, and recommended stations and corresponding frequency for best reception of the program that the user is attempting to receive. Some of these data elements are generally computable from other data elements generated by the FBRS. Database 510 can thus store subscriber and station profiles (i.e., frequencies, programs, broadcast geographic reach ability, etc.).

Figure 6:
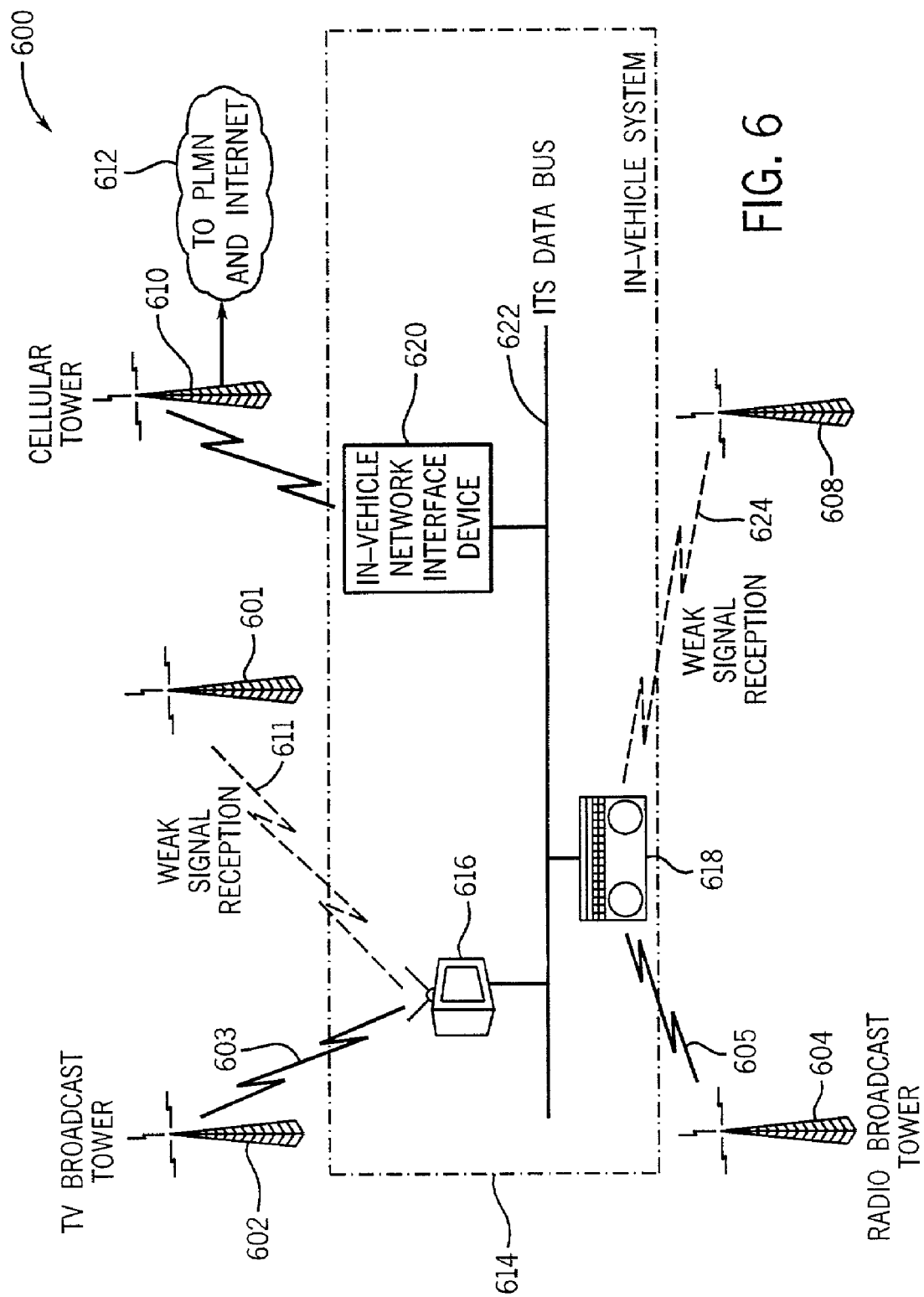
FIG. 6 depicts a schematic diagram of an in-vehicle architecture that includes an in-vehicle system in accordance with a preferred embodiment of the present invention.

FIG. 6 depicts a schematic diagram 600 of an in-vehicle architecture that includes an in-vehicle system 614 in accordance with a preferred embodiment of the present invention. Schematic diagram 600 generally depicts an in-vehicle system 614 that includes a data bus 622 to which a television 616 (e.g., in-vehicle television), radio 618 and an in-vehicle network interface device 620 may be connected. In-vehicle network interface device 620 may be configured as a wireless and Web-enabled network interface device such as, for example, an embedded computer, PDA (Personal Digital Assistant), and/or wireless telephone (e.g., a data-capable cellular telephone). In-vehicle network interface device 620 may be equipped as an in-car unit in the form of a non-portable box. Such an in-car unit may provide a noise "beep" to a user when a new frequency has been received from the associated FBRS server while also displaying that frequency. The user can then manually change the radio station or television if so desired, or the radio station or television station may automatically shift to the new frequency without user intervention, depending on initial settings programmed by the user. In-vehicle network interface device 620 generally communicates with an FBRS server. A mobile user (i.e., an individual in the car) can initiate the FBRS utilizing the in-vehicle network interface device 620.

Television 616 may receive, for example, a television signal 603 transmitting from a television transmitter 602 (i.e., a television broadcast tower). Television 616 may also receive a weak television signal 611 broadcast from a television transmitter 601. Similarly, radio 618 may receive a radio signal 605 transmitted from a radio transmitter 604 (i.e., a radio broadcast tower) and or a weak radio signal 624 broadcast from a radio transmitter 608. In-vehicle network interface device 620 can communicate with a cellular tower 610, which in turn communicates with a Public Land Mobile Network (PLMN) and the Internet as indicated at block 612. The network depicted at block 612 generally comprises an Internet-enabled wireless network. In-vehicle network interface device 620 can thus be utilized to wirelessly receive and transmit data to and from at least one remote server, such as location server 511 and/or FBRS server 508 of FIG. 5 through a telecommunications network, such as the network illustrated at block 612.

The term "Internet" is well known in the network arts and as utilized herein generally refers to the well-known worldwide system of computer networks (i.e., a network of networks) in which users at any one computer may, with permission, obtain information from any other computer and also communicate with users at other computers (e.g., e-mail capabilities). The Internet thus comprises a public, cooperative, and self-sustaining facility accessible to hundreds of millions of people worldwide. The Internet physically utilizes a portion of the total resources of the currently existing public telecommunications networks. The Internet can be distinguished from other computer networks through its heavy reliance upon a group of protocols referred to as the Transmission Control Protocol/Internet Protocol (TCP/IP). The most widely used part of the Internet is the so-called World Wide Web, which is often abbreviated as "WWW" or referred to simply as the "Web". The terms "WWW" and "Web" are well known in the networking arts.

Figure 7:
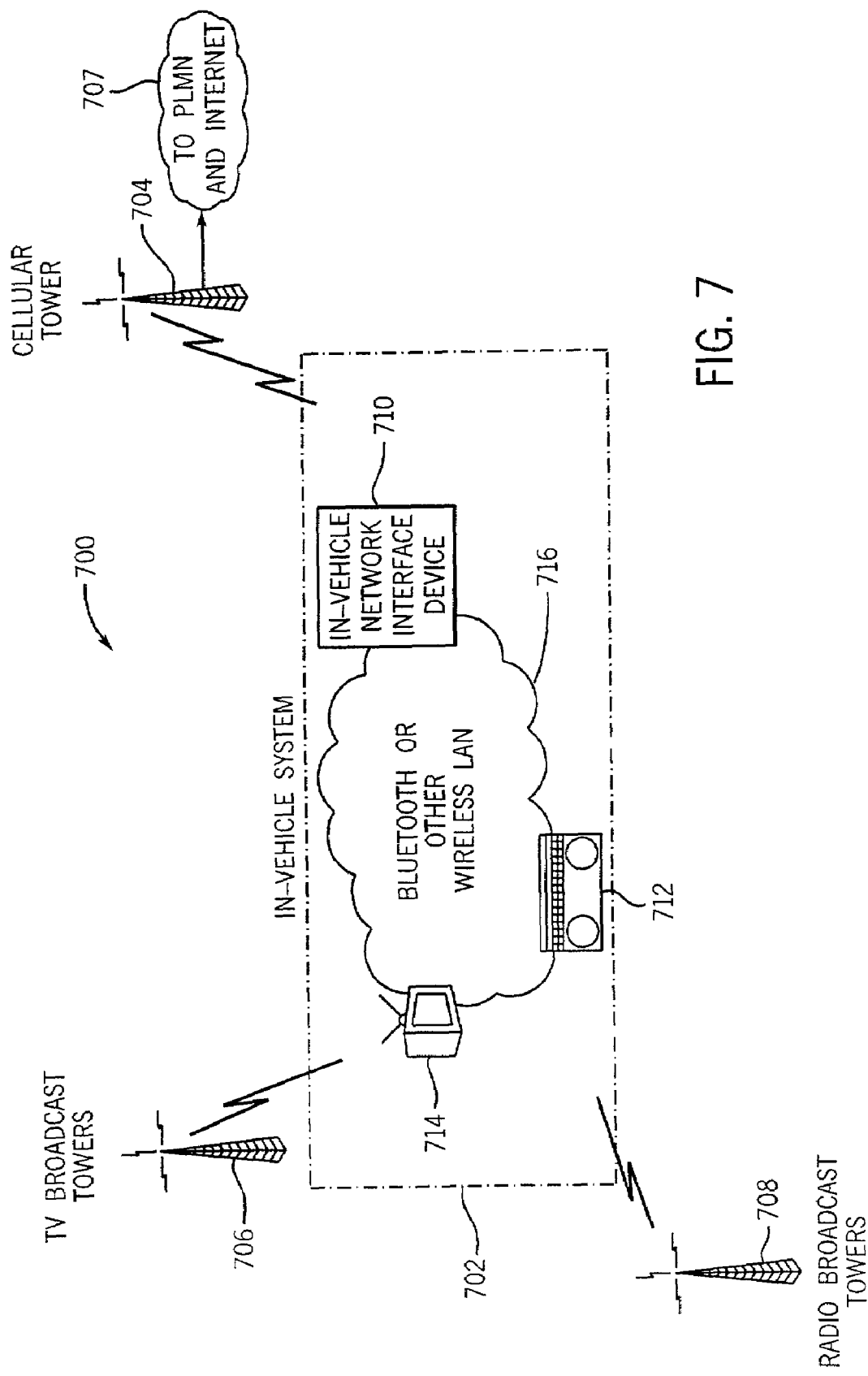
FIG. 7 illustrates a schematic diagram of an in-vehicle architecture that includes an in-vehicle system in accordance with an alternative embodiment of the present invention.

FIG. 7 illustrates a schematic diagram 700 of an in-vehicle architecture, which includes an in-vehicle system 702 in accordance with an alternative embodiment of the present invention. Schematic diagram 700 depicts a plurality of transmitters, including a television transmitter 706, a radio transmitter 708, and a cellular tower 704 which can communicate with a wireless cellular telecommunications network. In-vehicle system 702 includes a television 714, a radio 712 and an in-vehicle network interface device 710. Television 714 and radio 712 may interface with in-vehicle network interface device 710. Note that in-vehicle network interface device 710 of FIG. 7 is generally analogous to in-vehicle network interface device 620 of FIG. 6 and is generally configured as a wireless and Web-enabled Network Interface Device (WWNID).

In-vehicle network interface device 710 (and device 620) can also be configured as a Wireless Application Protocol (WAP) enabled device. WAP is a well known set of telecommunications protocols utilized to transfer data to wireless devices. WAP-enabled devices provide wireless users with a limited version of the Web designed to work on smaller portable communications devices, such as, for example, cellular telephones and wireless PDA devices. Websites accessed by WAP enabled devices can be re-written to satisfy the wireless application protocol. In order for this to be accomplished, Web pages written in HTML must be transferred to the WAP markup language (WML). Web browsers such as Netscape and Internet Explorer generally read pages in HTML, while a WAP-enabled browser, which is sometimes referred to as a "micro browser" may read pages constructed in WML. WAP is a set of open standards for bringing Internet content and to mobile communications devices. WAP was derived, as a standard to serve Internet contents and Internet services to wireless clients and WAP-enabled devices, such as mobile phones and terminals.

Television 714 and radio 712 can interface with in-vehicle network interface device 710 to receive requests for the frequency to which they are currently tuned, reply with the particular frequency, receive a new station frequency from the WWNID and automatically tune to that new frequency. In-vehicle network interface device 710 functions as a wireless and WWNID in order to interface with a human user for service initiation and/or interaction thereof. In-vehicle network interface device 710 interfaces with radio 712 and television 714 in order to request the frequency to which the radio and/or television is currently tuned and to request tuning to a new frequency, which provides a better reception. Note that the description herein with respect to FIG. 7 equally applies to similar components described herein with respect to FIG. 6. In-vehicle network interface device 710 also interfaces with a wireless telecommunications network by communicating with cellular tower 704, which in turn can communicate with a PLMN and the Internet, as indicated at block 707. Note that block 707 indicated in FIG. 7 is generally analogous to block 612 of FIG. 6. The network indicated at block 707 generally comprises an Internet-enabled wireless network. Internet data may be transferred, for example, from the network illustrated at block 707 through cellular tower 704 to in-vehicle network interface device 710, which can wirelessly receive and transmit data to and from one or more servers through at least one wireless network.

In-vehicle network interface device 710, radio 712 and television 714 may communicate through a local (e.g., in-vehicle) network 716, which may be configured as a wireless IEEE 802.11 network or another type of wireless local area network (LAN), such as, for example, a Bluetooth wireless network. Note that IEEE 802.11 is a network standard well known in the networking arts. Bluetooth is a type of wireless network adopted by a consortium of wireless equipment manufacturers referred to as the Bluetooth Special Interest Group (BSIG), and is also well known in the networking arts.

Figure 8:
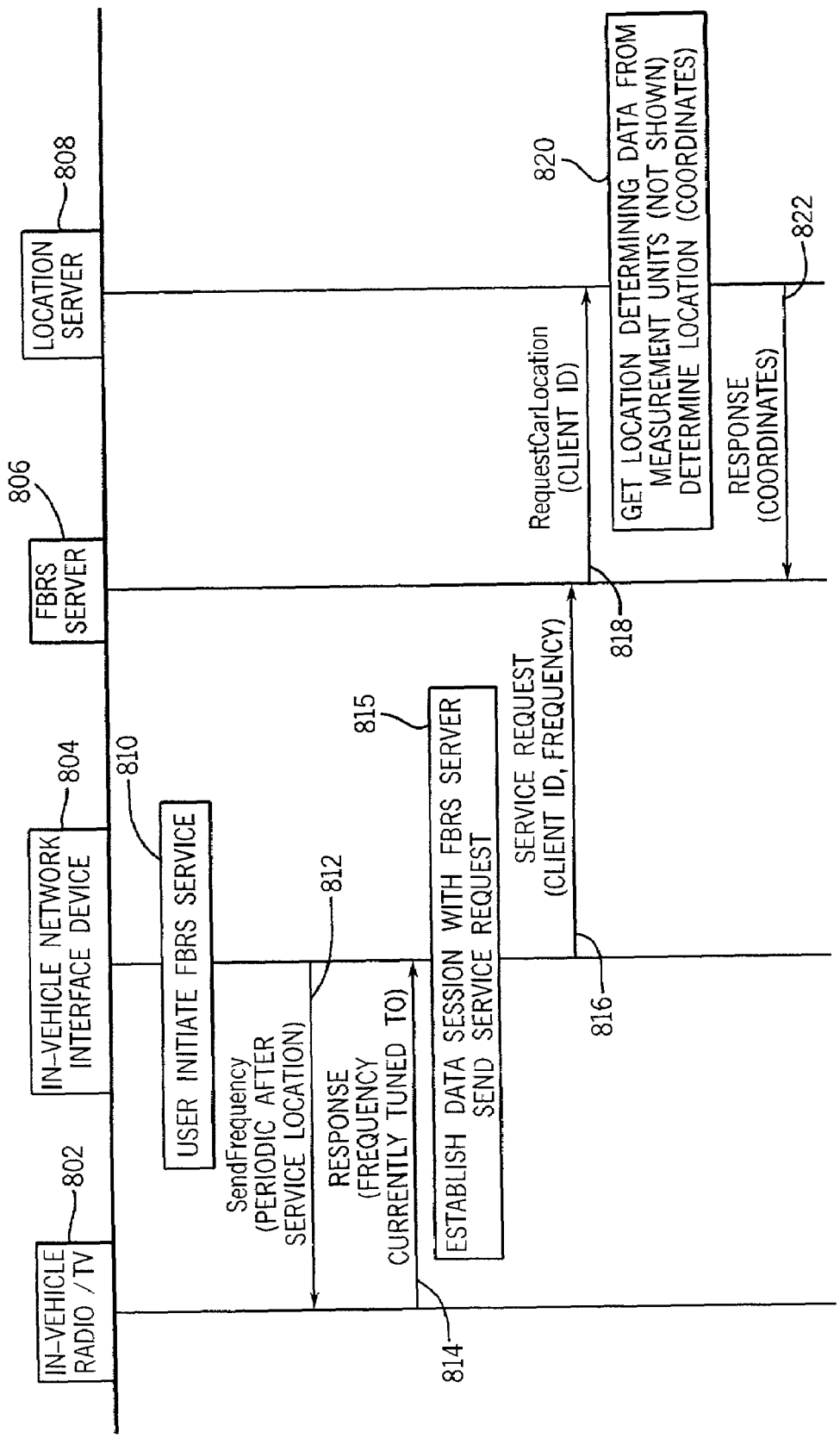
FIG. 8 illustrates a schematic diagram of a scenario, which may be implemented in accordance with a preferred embodiment of the present invention.

FIG. 8 illustrates a schematic diagram 800 of a scenario, which may be implemented in accordance with a preferred embodiment of the present invention. Schematic diagram illustrates four primary elements, which can interface with one another to provide seamlessly listening and/or viewing to a mobile user. Thus, an in-vehicle radio/television 802 can operate in concert with an in-vehicle network interface device 804, an FBRS server 806, and a location server 808. Those skilled in the art can appreciate that in-vehicle radio/television 802 is generally analogous to television 616 and/or radio 618 illustrated in FIG. 6 and television 714 depicted in FIG. 7. In-vehicle network interface device 804 is generally analogous to in-vehicle network interface device 620 depicted in FIG. 6 and in-vehicle network interface device 710 depicted in FIG. 7. Similarly, location server 808 is analogous to location server 511 illustrated in FIG. 5, while FBRS server 806 is analogous to FBRS server 508 illustrated in FIG. 5. Thus, the description provided herein with respect to FIG. 8 applies equally to the configurations illustrated in FIGS. 1 to 7 herein.

Note that the location server 808 generally interfaces with the FBRS server 806 for requesting and receiving location information. The location server interfaces with location measurement equipment, such as cellular cell sites, Global Positioning Satellite (GPS) ground stations, and/or a GPS-enabled car itself. Location server 808 also calculates the position of the mobile user (i.e., the user's car) and replies with the location of the car to the FBRS.

As illustrated at block 810, a mobile user can initiate the FBRS, and thereafter, as depicted at line 812, and periodically send requests to the in-vehicle radio/TV for the frequency to which the radio/TV is currently tuned. The in-vehicle radio/TV 802 can then respond, as indicated at arrow 814 with information indicating the frequency to which the in-vehicle radio/TV is currently tuned. Next, as illustrated at block 815, a data session can be established with the FBRS server 806 and a service request sent thereto. If the broadcast signal strength is automatically determined to be too weak or a user so determines, then additional information can be appended to the transmission of the frequency to which the user is currently tuned. As depicted next at arrow 816, a service request, including a client ID and frequency to which the in-vehicle radio/TV is tuned may be provided to the FBRS server 806. Next, as illustrated at arrow 818, a request for the current location of the mobile user (e.g., a car) is sent to location server 808, along with the client ID. As indicated next at block 820, the location server determines the location of the mobile user utilizing particular measurement units (not illustrated in FIG. 8). Thereafter, as depicted at arrow 822, a response from the location server 808 occurs, which includes the geographic coordinates (i.e., location) of the user.

The FBRS now possesses information regarding the location and current frequency tuned to by the user. If the FBRS for the user has been activated for a while, the FBRS will also possess (i.e., via prior execution of the aforementioned procedure) a sample of recent (e.g., within one hour) user locations while tuned to that frequency. With this information and access to particular database information, the FBRS can infer the station to which the user is currently listening. Such database information includes geographic broadcast coverage areas of stations transmitting at that frequency. If the current location of the user is within the broadcast area of two stations broadcasting at that frequency (presumably in the fringe areas of both stations), then there exists an ambiguity regarding the particular station that the user desires to hear. The FBRS can resolve this ambiguity utilizing data concerning the user's prior locations at which the user presumably received a good reception (i.e., located within the broadcast area of only one station). That station is thus presumed to be the station whose programming the user desires.

Having determined the station to which the user has been listening, the FBRS next consults a database of station programming to learn what program that station is currently broadcasting. Thereafter, the FBRS can consult a database to determine what other station (i.e., regardless of its broadcast frequency) both broadcasts that program and possesses core (i.e., nonfringe) coverage areas, including the user's current location. The frequency of that station can then be returned to the vehicle telematic unit, which either displays the new recommended frequency to the user or automatically tunes the radio/television to that frequency.

If the FBRS search for a station broadcasting the desired program to a coverage area that includes the users' current location fails, then a station broadcasting a program of a similar type (e.g., jazz, rock, talk, etc.) with an appropriate broadcast coverage area is returned to the vehicle telematic unit.

The present invention may be implemented as a program product (i.e., computer program product) composed of one or more modules. The term "module" as utilized herein thus generally refers to a software module. In the computer programming arts, a module can be implemented as a collection of routines and data structures that performs particular tasks or implements a particular abstract data type. Modules generally are composed of two parts. First, a software module may list the constants, data types, variable, routines, and so forth that can be accessed by other modules or routines. Second, a software module may be configured as an implementation, which can be private (i.e., accessible only to the module), and which contains the source code that actually implements the routines or subroutines upon which the module is based. Thus, when referring to a "module" herein, the present inventors are referring so such software modules or implementations thereof.

It can be appreciated by those skilled in the art that the methods and systems described herein, including, for example, the FBRS can be implemented as a series of modules either function alone or in concert with physical electronic and computer hardware devices. Such modules can be utilized separately and/or together locally and/or remotely to form a program product thereof that can be implemented through signal-bearing media, including transmission media and recordable media. The present invention can be implemented as a program product composed of a plurality of such modules, which can be interactively displayed for a user on a display screen of a data-processing system (e.g., computer). Such interactivity may be provided by a graphical user interface (GUI), which is well known in the art, including Internet browser applications thereof.

Thus, for example, the present invention can be implemented as a system for seamlessly offering particular broadcast data to a user moving among a plurality of broadcast coverage areas. Each such area requires the use of a different tuning frequency to receive the particular broadcast data (e.g., a program). Such a system may includes a receiver for receiving at a user location a first signal containing desired data, wherein the first signal is broadcast from a first transmitting station associated with a first broadcast coverage area, and a module for automatically determining at the user location a second transmitting station associated with a second broadcast coverage area broadcasting a second signal containing the desired data, thereby permitting the user to seamlessly receive the data as the user moves among a plurality of broadcast coverage areas. It can be appreciated that other modules may also be utilized in association with such a system to perform particular processing functions. Note that the data utilized to determine the frequency to which an in-vehicle radio and/or television can be tuned or selected, includes, for example, the current program to which the mobile user is tuned, the location of the user, the associated broadcast program schedules of stations near the present user location, a station-frequency table, and/or a history of vehicle locations.

A history of locations may simply comprise a compilation of recent (e.g., the last hour or two) sampled user locations. If the user's current location and listening frequency map to more than one program (e.g., the user is between cities that each have a station using that frequency), then the ambiguity thereof can be resolved by the service logic of this feature by utilizing recent prior locations where the user listened to the same frequency to which he or she is currently listening. Presumably, in such a case, the user did not receive a mixed reception in the recent past. Thus, the prior location can be utilized to provide an unambiguous mapping from frequency to program. Once a program or content is known, the next step is to simply map the current location to a frequency with that content and to inform the unit (e.g., In-vehicle network interface device 710) within the car the identity of that frequency or signal.

Based on the foregoing, it can be appreciated that the present invention generally discloses a method and system for seamlessly facilitating reception of broadcast data by a user moving among a plurality of broadcast coverage areas. A first signal containing desired data may be received by a receiving device at a user location, wherein the first signal is broadcast from a first transmitting station associated with a first broadcast coverage. Thereafter, the receiving device (e.g., a radio or in-vehicle television) can be automatically instructed to tune to a second transmitting station associated with a second broadcast coverage area broadcasting a second signal containing the desired data, if the first signal fades at the user location, thereby permitting the user to seamlessly receive data as the user moves among a plurality of broadcast coverage areas. The receiving device can also be automatically instructed to tune to a third transmitting station broadcasting a third signal containing data of a type associated with the desired data, if the second signal containing the desired program cannot be identified. The present invention disclosed herein can thus be implemented utilizing a Follow-me Broadcast Reception Service (FBRS), which is described in greater detail herein, and which generally comprises a located-based service that provides seamless listening or viewing capabilities for a radio or television broadcast receiver when a mobile user moves among the coverage areas of broadcast stations.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered. The description as set forth is not intended to be exhaustive or to limit the scope of the invention. Many modifications and variations are possible in light of the above teaching without departing from the spirit and scope of the following claims. It is contemplated that the use of the present invention can involve components having different characteristics. It is intended that the scope of the present invention be defined by the claims appended hereto, giving full cognizance to equivalents in all respects.

We claim:

1. A method for seamlessly facilitating reception of broadcast data by a user moving among a plurality of broadcast coverage areas, said method comprising the steps of:
   receiving, by a receiving device at a current location of the user, a first signal containing desired data, wherein said first signal is broadcast from a first transmitting station associated with a first broadcast coverage area, wherein said desired data comprises audio, video, and/or multimedia data; and
   if said first signal fades at said current location, automatically tuning at said current location to a second transmitting station associated with a second broadcast coverage area broadcasting a second signal containing said desired data, thereby permitting said user to seamlessly receive said data as said user moves among a plurality of broadcast coverage areas;
   wherein the step of automatically tuning comprises the steps of:
   sending a service request to a remote server from an in-vehicle wireless data communication device that is connected with the receiving device by a data bus, wherein the service request comprises a client ID for the in-vehicle wireless data communication device and a frequency of the first signal; and
   receiving a frequency of the second signal from the remote server
   tuning to the frequency of the second signal.

2. The method of claim 1 further comprising the step of:
   automatically tuning at said current location to a third transmitting station associated with a third broadcast coverage area broadcasting a third signal containing data of a type associated with said desired data, if said second signal containing said desired program cannot be identified.

3. The method of claim 2 further comprising the step of: tuning to said third transmitting station based on data contained in a user profile stared within a database.

4. The method of claim 1 further comprising the step of: searching for a transmitting station broadcasting a signal with a same theme as the first transmitting station; and tuning to said transmitting station, if a prior signal containing said desired data fades.

5. The method of claim 1 wherein the step of automatically tuning to a second transmitting station broadcasting a second signal containing said desired data, if said first signal fades at said current location, further comprises the step of:
   automatically tuning to a second transmitting station broadcasting a second signal containing said desired data, in response to a user request, if said first signal fades at said current location.

6. The method of claim 1 wherein said desired data comprises a radio program transmitted from a radio transmitting station.

7. The method of claim 1 wherein said desired data comprises a television program broadcast from a television transmitting station.

8. The method of claim 1 further comprising the step of:
   locating at said current location an in-vehicle network interface device for wirelessly receiving and transmitting data to and from at least one remote server through at least one wireless network.

9. The method of claim 8 wherein said at least one remote server comprises a Follow-me Broadcast Reception Services (FBRS) application server.

10. The method of claim 1 further comprising the step of:
    selecting said signal of said second transmitting station associated with said second broadcast coverage for tuning thereof based on user data contained in a user profile within a database.

11. The method of claim 1, wherein the step of searching for the transmitting station broadcasting the signal containing said desired data based on at least one prior location comprises the step or:
    searching for the transmitting station broadcasting the signal containing said desired data based on a history of user locations, wherein the history of user locations comprises a plurality of user locations, wherein the plurality of user locations comprises the prior location.

12. An apparatus for facilitating reception of a broadcast program by a receiving device moving among a plurality of broadcast coverage areas, the apparatus comprising:
    a remote server communicatively coupled with a database of broadcast station profiles and communicatively coupled with a location server;
    wherein the remote server is configured to receive a request from an in-vehicle wireless data communication device over a wireless network, wherein the request comprises a client ID and a first broadcast program frequency;
    wherein the remote server is configured to query the location server for a current location of the in-vehicle wireless data communication device based on the client ID;
    wherein the remote server is configured to select a second broadcast program frequency from the database of broadcast station profiles based on the current location of the in-vehicle wireless data communication device and at least one prior location of the in-vehicle wireless data communication device, wherein the first broadcast program frequency is associated with the broadcast program in a first broadcast coverage area and the second broadcast program frequency is associated with the broadcast program in a second broadcast coverage area;
    wherein the remote server is configured to send the second broadcast program frequency over the wireless network to the in-vehicle wireless data communication device for employment by the receiving device to continue to receive the broadcast program.

13. The apparatus of claim 12, wherein the remote server comprises a Follow-me Broadcast Reception Services (FBRS) application server.

14. The apparatus of claim 12, wherein the broadcast program comprises a radio program transmitted from a radio transmitting station.

15. The apparatus of claim 12, wherein the broadcast program comprises a television program broadcast from a television transmitting station.

16. The apparatus or claim 12, wherein the remote server is configured to select the second broadcast program frequency based on a user profile associated with the client id.

* * * * *